March 26, 1940.  H. E. HEIGIS  2,195,213
FUEL TANK EVACUATING APPARATUS
Filed April 15, 1936  3 Sheets-Sheet 1
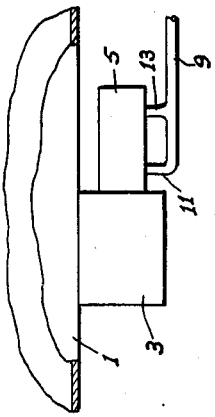
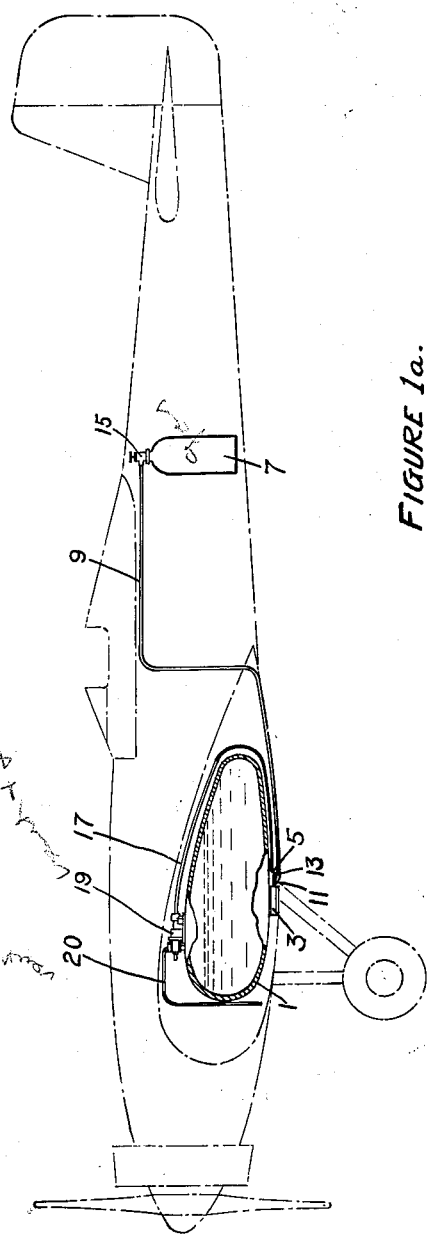
INVENTOR
HENRY ERNEST HEIGIS
BY Paul G. Anderson
ATTORNEY March 26, 1940. H. E. HEIGIS 2,195,213
FUEL TANK EVACUATING APPARATUS
Filed April 15, 1936 3 Sheets-Sheet 2
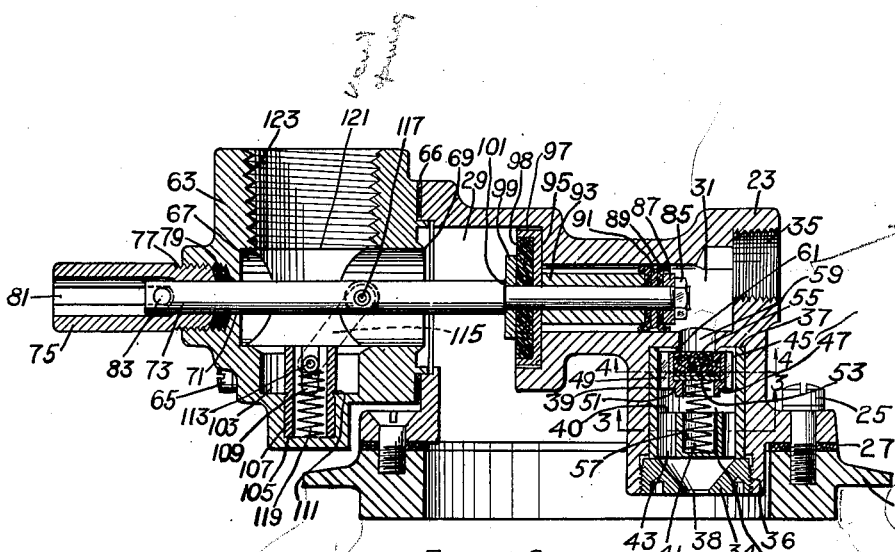
FIGURE 2
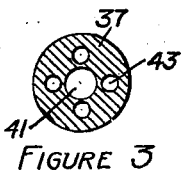
FIGURE 3
FIGURE 4
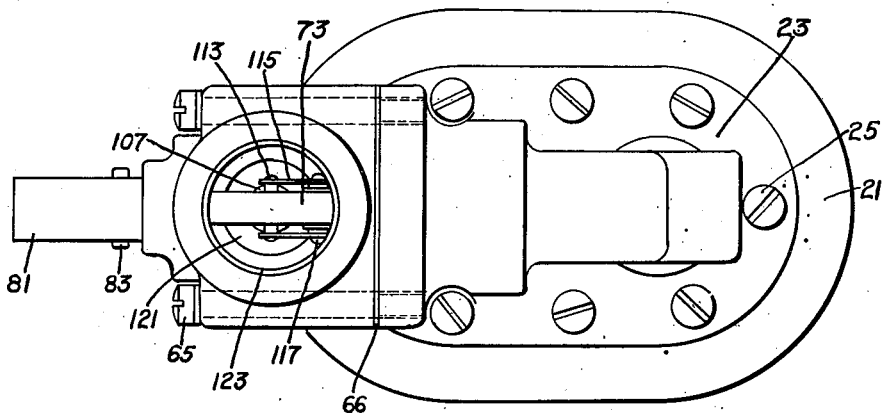
FIGURE 5
INVENTOR
HENRY ERNEST HEIGIS
BY Paul J. Anderson
ATTORNEY March 26, 1940. H. E. HEIGIS 2,195,213
FUEL TANK EVACUATING APPARATUS
Filed April 15, 1936   3 Sheets-Sheet 3

INVENTOR
HENRY ERNEST HEIGIS
BY Paul Anderson
ATTORNEY

Patented Mar. 26, 1940

2,195,213

UNITED STATES PATENT OFFICE 2,195,213

FUEL TANK EVACUATING APPARATUS

Henry Ernest Heigis, West Orange, N. J., assignor to Walter Kidde & Company, Inc., Bloomfield, N. J., a corporation of New York Application April 15, 1936, Serial No. 74,452

12 Claims. (Cl. 137—21)

The present invention relates to a rapid means for discharging the contents of a fuel tank. It particularly refers to the discharge of the fuel from the fuel storage tanks of aircraft in order to render the fuel tanks available to serve as flotation elements to support the airplane and prevent it from sinking if it has landed on water.

Various methods have been proposed to convert the fuel tanks of an airplane into flotation means for the airplane, when the airplane has chanced to alight on a body of water, so that the plane and the pilot may be saved. The advantage of using the fuel tanks in this capacity is that very little extra equipment is required in comparison with the equipment which is necessary when the airplane is provided with a separate flotation means.

It has often been proposed to use a non-inflammable high pressure gas, such as carbon dioxide, to force the fuel from the storage tank and several systems for accomplishing this purpose have been devised. These systems have not always been practical because they involved the use of cumbersome appliances and were not applicable to all airplanes since they used apparatus which is not usually associated with the fuel tank.

A great many modern airplane storage tanks are equipped with a dump valve to permit the draining of the fuel from the tank, and a vent line to allow the entrance of air into the fuel reservoir as the fuel is drawn out and used in the motor. The fuel is thus permitted to flow freely. Also collapse of the tank is prevented due to changes in altitude with the attendant change in the atmospheric pressure.

It is therefore very desirable when a gas, such as carbon dioxide, is employed to force the fuel from the storage tank of an aeroplane to convert the tank into a flotation member, to discharge the fuel through the tank dump valve. At the same time it is important to make certain that the dump valve will be opened by the gas pressure before any gas is introduced into the fuel tank, to prevent bursting of the tank by the gas pressure, to make certain that the vent is closed, and to prevent escape of the gas therethrough before it has forced all of the fuel out of the tank.

It is accordingly an object of the invention to provide an apparatus to convert an aeroplane fuel storage tank into a flotation member.

A further object is to provide means whereby a fluid under pressure may evacuate a liquid storage tank.

An additional object is to provide means on a liquid storage reservoir whereby the pressure of a gas will open the reservoir dump valve, close the reservoir vent, and force the liquid from the tank in the order named.

It is a further object of the invention to discharge the contents of a fuel storage tank through the dump valve.

Another object is to shut the vent line so that there can be no entrance, or escape, of air or gas, to or from a fuel storage reservoir when the gas is discharged into the reservoir to drive the fuel therefrom.

It is still a further object of the present invention to provide means whereby the dump valve on a fuel tank is opened to allow the escape of the fuel before the gas is permitted to enter the storage tank to force out any fuel which is stored there. It is this feature which provides insurance that the storage tank will not burst due to the pressure of the gaseous fluid used to drive the fuel from the tank.

A further object of the invention is to provide a means whereby the vent line on the storage tank is automatically closed when the gas enters the tank.

A further object is to provide an apparatus which will not permit introduction of the gas into the tank before the dump valve has been opened.

Further objects of this invention will be apparent as the invention is described in connection with the drawings, wherein:

Figure 1 is a view in section of a fuel storage tank, provided with a plan view of the tank evacuating equipment constructed in accordance with the present invention and applied to an aeroplane which is indicated in dot and dash lines.

Figure 1a is an enlarged diagrammatic view of a portion of Figure 1, showing more clearly the conduit connections to the dump valve operating mechanism.

Figure 2 is a view in section of a device for closing the vent and introducing a fluid under pressure into a tank constructed in accordance with the present invention.

Figure 3 is a view in section of a portion of the apparatus taken on line 3—3 of Figure 2, and looking in the direction of the arrows.

Figure 4 is a view in section of a portion of the apparatus taken on line 4—4 of Figure 2, and looking in the direction of the arrows.

Figure 5 is a top plan view of the device of Figure 2.

Figure 6:
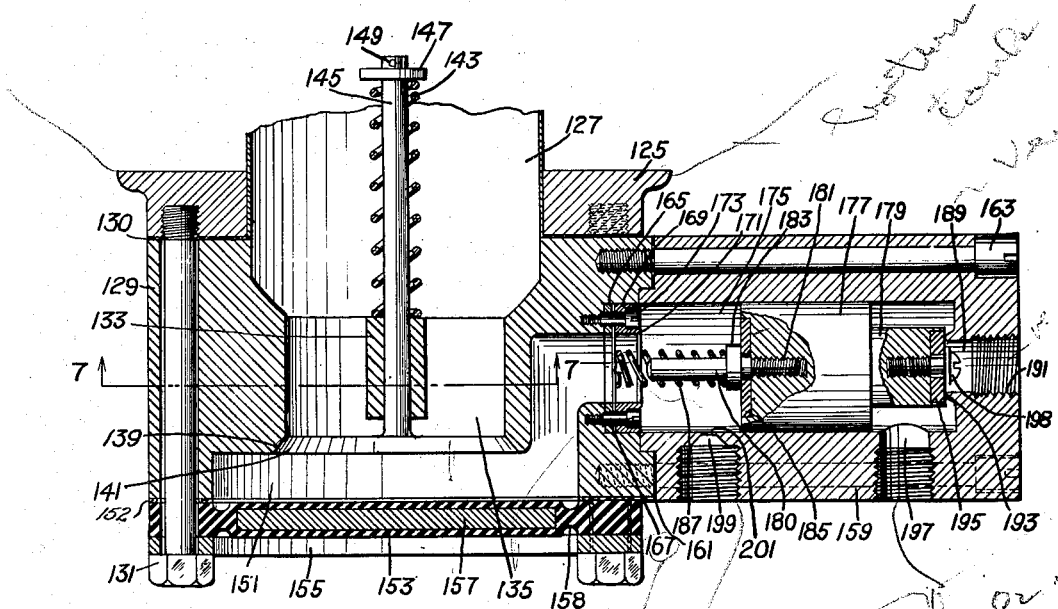
Figure 6 is a view in section of the dump valve apparatus constructed in accordance with the present invention.

Referring to Figure 1, a fuel storage tank as used on an aeroplane is shown at 1. At the bottom of the tank is a dump valve apparatus 3 having attached thereto an operating mechanism 5 which will operate the valve when a gas under pressure is supplied thereto. The details of the dump valve and the mechanism 5 will be fully described hereinafter.

A source of gas under pressure 7, such as carbon dioxide, is connected to the mechanism 5 by a conduit 9. This conduit has two branches 11 and 13 that connect separately to the operating mechanism 5. The source of carbon dioxide 7 is provided with a valve 15 to control the discharge of the gas therefrom and is of the ordinary type and will not be described in detail since it forms no part of the present invention.

Another conduit 17 connects the operating mechanism 5 to the vent control and discharge valve 19. A vent line 20 connects the vent valve to the atmosphere under normal conditions. The operation of this valve will now be described by reference to Figure 2.

The tank 1 of Figure 1 is provided with a hub flange 21 which may be secured to the tank in various methods but is preferably made integral with the tank. On this hub flange is mounted a main valve body 23 which is secured to the flange by the studs 25. In order to secure a leakage proof joint between the body 23 and the flange 21 a gasket 27 is provided. The body 23 has a main chamber 29 which communicates directly with the interior of the tank 1. A second chamber 31 is also provided which opens into the chamber 29. The second chamber is likewise associated with a third chamber 33 which, similarly to chamber 29, leads directly to the interior of the tank. A threaded opening 35 is provided on the wall of the body which connects with the chamber 31. The conduit 17 of Figure 1 which joins the mechanism 5 to the valve 19 is secured to the body 23 by this threaded opening and serves to convey carbon dioxide to the valve 19.

At one end of the chamber 33 is a nozzle 34 which is fastened to the wall of the chamber by threads 36. It is through the opening 38 in the nozzle body that the carbon dioxide is discharged into the tank. Above the nozzle and resting on it is a metal bushing 37. The bushing 37 consists of a sleeve portion 39, across one end of which is a stop 40. In the center of the stop a pocket 41 is formed and surrounding this pocket are passages 43 which extend through the entire stop as illustrated in Figure 3.

In the sleeve 39 is a check valve 45 which consists of a metal body 47. As is shown in Figure 4, slots 49 are spaced around the outer edge of the check valve body 47. The check valve body 47 has a passage therethrough which is larger at one end than at the other. Where the passage becomes smaller a shoulder 51 is formed. A stop plate 53 is placed on the shoulder and resting on this plate is a filler 55. The filler is made of a rubber-like material which is resilient and at the same time impervious to the fuel in the tank. Between the check valve 45 and the metal bushing 37 is a spring 57. One end of the spring rests in the small passage of the check valve body 47 against the plate 53 and the other end rests against the bottom of the pocket 41 in the bushing 37.

It will thus be seen that if pressure is applied to the upper surface of the filler 55 the entire check valve will move back and compress the spring 57 until the check valve rests on the stop 40. Fluid may then pass through slots 49, the passages 43 to the nozzle opening 38.

Between the second chamber 31 and the third chamber 33 is a short passage 59 which is smaller in diameter than the diameter of the third chamber. Where this passage enters the third chamber a seat 61 is formed. The check valve 45 rests on this seat and is pressed tightly against the seat by the spring. The check valve 45 thus effectively prevents passage of any fluid medium through the third chamber until it has been unseated. The check valve 45 has a further purpose. After a gas has been discharged into the tank the check valve will return to its seat and will be held there by the pressure of the gas in the tank and the spring. In this manner leakage of the gas in the tank back into the conduit leading to the dump valve is effectively prevented.

A bonnet 63 is secured to the body 23 by any suitable means as for instance the studs 65 as will be seen in Figure 5. A gasket 66 is provided to prevent leakage at the joint. The bonnet contains a passage 67 which opens into the main chamber 29 of the body 23. Surrounding the end of the passage which communicates with the chamber 29 is a seat 69, the purpose of which will be explained hereinafter. At the other end of the passage 67 is an opening 71 which is smaller in circumference than the passage 67. Resting in this opening and guided by it is the valve rod 73 which extends outside of the bonnet wall. A hollow valve guide 75 through which the rod may slide, further supports the rod and is attached to the bonnet by screw threads 77. In order to prevent leakage where the valve rod passes through the wall of the bonnet, packing 79 is interposed between the wall of the opening and the guide member. Obviously, the packing compression may be adjusted by turning the valve guide on the threads 77.

Two slots 81 are provided opposite each other in the walls of the guide member. A pin 83 extends through the rod 73, through the slots of the guide member to a point external to the guide member.

This pin serves as a safety measure to prevent the rod from moving too far into the valve body and bonnet and so that the rod may easily be removed if it is so desired. Its main purpose, however, is to serve as an indicator of the position of the rod so that it may be determined whether the valve has been operated and the exact position of the valve at any particular moment.

The rod extends through the passage 67 into the main chamber 29 of the body 23 and into the second chamber 31. At the end of the rod 73 in the chamber 31 the rod is threaded to receive a nut 85. Bearing against the nut on the rod is a metal washer 87. In juxtaposition with the washer bearing tightly on the wall of the chamber 31 and surrounding the rod are two leather packing washers 89 which are separated by a metal spacer 91. Bearing against the inner washer 89 is a metal sleeve 93 which fits over the rod.

At the point where the second chamber 31 meets the main chamber 29 a shoulder 95 is formed. A metal piston holder 97 carried by the rod bears against this shoulder 95 and the sleeve 93. In the piston holder is a piston 98 of resilient material impervious to the fuel in the tank which is kept in place by a metal collar 99. The metal collar 99 in turn bears on a shoulder 101 formed on the rod.

It will thus be seen that tightening of the nut 85 will compress all the parts between it and the shoulder 101 and hold them securely in position.

To one side of the passage 67, in a recessed chamber 103, is lodged a toggle guide 105, which consists of a sleeve 107 with two slots 109 cut therein. The guide is held in place by some method such as peening over of the part of the bonnet as at 111. A pin 113 which is adapted to slide in the slots has secured thereto two toggle links 115. The other ends of these links are secured to a pin 117 which passes through the piston rod. A spring 119 is placed in the toggle guide and bears against the pin 113 tending to push the pin out of the slots.

With this arrangement it will be seen that if the piston rod is moved by a gas under pressure entering the chamber 31 the pin will move down and compress the spring as the pin 117 passes over the toggle guide and will again expand when the piston 101 has reached the seat 69. The toggle arrangement will then hold the rod in the new position under the action of the spring 119 and the rod cannot be returned to its former position except by exerting a positive pressure on the outer end of the rod. Before the piston rod has actually been moved by gas pressure it should be noted that the toggle will hold the piston holder 97 against the shoulder 95. Thus the rod will be held in either one of the extreme positions by means of the toggle arrangement.

Opposite the toggle chamber 103 and communicating with the passage 67 is a vent opening 121 having threads 123 which are provided in order that the vent line 20 may be secured to the bonnet.

The operation of the vent valve will now be explained. Under normal conditions the interior of the tank 1 is in open communication with the atmosphere through the chamber 29, the passage 67, the opening 121 and the conduit 20. However, when it is desired to discharge the fuel from the tank, gas is introduced by the conduit 17 to the chamber 31. When the gas strikes the end of the rod and cup leathers 89 the pressure is sufficient to move the rod against the resistance of the toggle arrangement and the piston rod then moves over so that the piston 98 rests tightly against the seat 69. The gas at the same time pushes the check valve 45 from its seat and permits the gas to pass through the slots 49, the holes 43 and through the nozzle opening 38 into the tank. The nozzle has a restricted opening so that the pressure of the gas in the chamber 31 will be sufficient to move the piston 98 to its new position before any gas can collect in the chamber 29 and prevent movement of the rod. At the same time the nozzle meters the amount of gas entering the tank in order that the pressure forcing the fuel from the tank shall not become so great that it will burst the tank and in order that the amount of gas in the tank may be increased as the space above the fuel is increased due to the discharge of the fuel.

When the piston 98 has assumed its position on the shoulder 69 it will be held there by both the toggle arrangement and the gas in the tank entering the chamber 29 and pressing on the piston holder 95. This, of course will prevent all further escape of gas or air from the tank through the vent opening 121.

With the arrangement of this device which incorporates a positive vent closing means and the check valve 45 all escape of gas from the tank is prevented when the gas supply has been exhausted. It will be readily seen that when this has occurred the pressure of the gas in the tank holds both the piston valve 99 and the check valve 45 on their respective seats so as to seal the gas in the tank.

Figure 7:
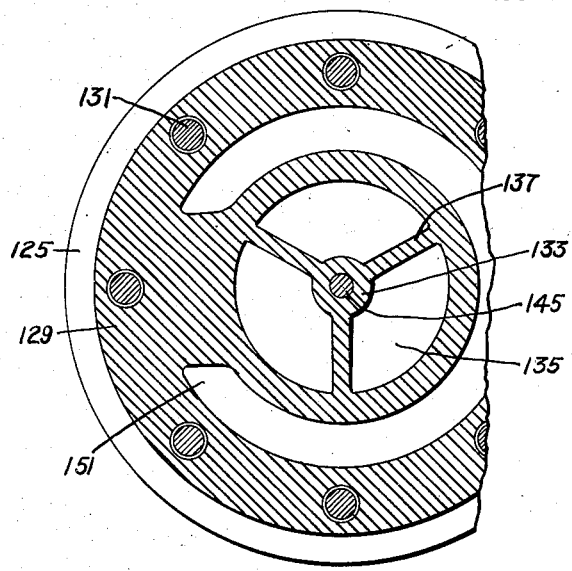
Figure 7 is a view in section taken on line 7—7 of Figure 6 and looking in the direction of the arrows.

The details of the dump valve 3 will now be explained with particular reference to Figures 6 and 7.

The bottom of the tank is provided with a flange 125 welded to the tank and surrounding the opening 127. A valve casing 129 bearing on a gasket 130 between the casing and the flange is fastened to this flange by the studs 131. A bushing member 133 is supported in the center of the chamber 135 of the valve casing by the ribs or webs 137 which are best seen in Figure 7. At the end of the chamber is a valve seat 139 on which a valve disc 141 bears, being held there by the spring 143 which surrounds the stem 145 that carries the valve disc 141. One end of the spring is compressed against the bushing 133 and by the action of the washer 147 which is prevented from sliding off the valve stem by the pin 149.

Below the seat 139 is a passage 151 which opens to the exterior of the valve casing. At the bottom of the casing bearing on a gasket 152 is a disc member 153 of some moldable substance which will fracture under pressure and is impervious to the fuel which is stored in the tank. The disc member consists of a metal plate 157 about which the disc member is molded. Surrounding the metal plate are annular depressions 158 in the disc member. These depressions are provided in order to furnish a smaller cross-sectional area than the remainder of the member 153 and accordingly will be the weakest portion of the disc member and will be the point at which the member will burst most readily. The purpose of the metal plate 157 is to reinforce the center of the disc member so that it will not rupture at the center when pressure is applied to the member but will shear off at the depression sections at 158. A metal gasket 155 is adjacent the disc holder and both are secured to the casing by the studs 131.

At one side of the valve casing 129 is a piston valve chamber 159. A gasket 161 is inserted between the chamber 159 and the casing 129 when they contact each other and the whole is securely fastened together by the studs 163. Across the opening of the passage 151 is placed a washer 165 and a frangible disc 167. The washer is made of some material such as "Duprene". The washer 165 and the disc 167 are held on the valve casing 129 by a bushing 169 secured to the casing by the screws 173. Surrounding the opening in the bushing 167 is a valve seat 171.

In the passage 175 of the casing 159 is a piston consisting of an enlarged portion 177 which just fits in the passage and a smaller portion 179. A stud 180 is secured to the enlarged portion 177 by threads 181 and has near its center a head 183. The head holds a piston valve 185 of resilient material in a recess which is provided on the enlarged piston. Surrounding the stud 180 is a spring 187 held under slight compression between the disc 167 and the piston valve 185.

A vent opening 189 and a surrounding seat 193 in the passage 175 are provided at the end of the chamber which is opposite to the seat 171 and are centrally aligned therewith.

The vent opening has threads 191 to which the valve conduit 17 may be secured in order to connect the dump valve with the vent valve. The small portion 179 of the piston carries a resilient valve disc 195 secured thereto by a screw and washer 198. This valve disc coacts with the valve seat 193.

Opening into the passage 175 through a side wall of the chamber are a passage 197 and a passage 199. The opening 197 is relatively close to the end of the chamber in which the vent valve line opening 189 is located and the other opening 199 is relatively close to the valve seat 171. These openings are threaded to receive conduits connecting the chamber to the source of carbon dioxide supply. The opening 199 is provided with a nozzle 201 through which the carbon dioxide passes in entering the chamber in order that it may be metered.

The dump valve is shown in its unoperated position. In this position the fuel confined in the tank may leak into the passage 151 but it cannot get into the passage 175 because the frangible disc 167 will prevent all leakage therethrough. However, when it is desired to discharge the fuel from the tank the valve 15 on the source of carbon dioxide supply 7 is opened to permit the gas to flow through the conduit 9 to the piston valve chamber 159. The gas enters the passage 175 at a high pressure through the opening 197 and acts on the piston 177 but it cannot move the piston because at the same time gas has been entering the passage through the nozzle 201. The area of the face of the piston subject to the pressure of the gas entering through the nozzle 201 is much greater than the area of the piston which is subject to the pressure of the gas entering the opening 197 and hence the gas entering through the latter opening cannot move the piston.

When enough gas has entered the passage through the nozzle 201 the pressure will be high enough to burst the frangible disc 167 and thus the gas pressure may be introduced into the passage 151. The pressure will then be transmitted to the frangible disc 153 which will shear in turn, providing a relief for the gas pressure introduced by the nozzle 201. It is obvious that it does not matter whether there is fuel in the passage 151 or not since in any event the pressure of the gas will be transmitted to the disc 153.

As soon as the disc 153 has been broken the gas pressure in the portion of the chamber supplied by the nozzle 201 will fall to a point where the gas pressure on the other side of the piston will be sufficient to move the piston over so that the piston 185 will seat on the seat 171 and the nozzle 201 will be closed off. At the same time the vent opening 189 will be opened to permit the gas to pass to the vent valve. With this arrangement it is impossible for any gas to enter the tank through the vent valve until the dump valve is free to discharge the fuel through the opening in the disc 153. With a construction like this it is impossible to rupture the tank by supplying gas pressure to a tank from which no fuel can escape.

The operation of the entire arrangement is very simple. The gas valve 15 is opened and the gas escapes from the container 7 through the conduit 9 to the dump valve operating device. After the gas has ruptured the dump valve disc the gas passes through the conduit 17 to the vent valve 19 where the vent opening is closed and gas is introduced into the tank. The pressure of the gas forces the fuel against the valve disc 141 forcing it from its seat and expels the fuel through the opening in the disc 153.

After all of the fuel has been discharged from the tank and enough of the gas pressure in the tank has been dissipated the valve disc 141 will be returned to its seat by the spring 143. The combined action of the spring and the external media acting on the valve disc will hold the disc on the seat and thus prevent further escape of any gas remaining in the tank. In this manner the buoyant effect of the gas can be utilized in the tank and allow the emptied tank to be used as a flotation member.

It will, of course, be apparent that the main function of the valve 141 is to close the tank against the entry of external media (specifically, water from the body of water on which the aeroplane has descended) after the fuel has discharged from the tank, it being also a function of the valve to isolate the space adjacent the closure disc 153 from the tank when the fluid medium is admitted to the space to rupture the disc, to thereby confine the fluid medium to render it effective to rupture the disc; and since it is important to discharge substantially all of the fuel from the tanks, the spring 143 should be relatively light, so as not to appreciably impede the discharge of the fuel. In fact, in the actual application of the invention, the spring 143 is so light that vibration of the aeroplane with consequent vibration of valve 141 will cause fuel from the fuel tanks to leak into the passage 151 adjacent the closure disc 153, which latter alone is relied upon to normally seal the discharge opening of the tanks against the discharge of the fuel, it being actually necessary for the spring 143 to be only strong enough to lift the valve 141 to its seating position after the tank has been emptied. Such leakage of the fuel into the passage 151 is, of course, harmless, since in any event the pressure of the operating fluid medium will be transmitted to the disc 153 through the liquid, as previously referred to in the description of this invention.

It will, of course, be also appreciated that the actual pressure at which the valve 141 will open is dependent upon the strength of the spring 143, the fullness of the tank and the corresponding head of the liquid in the tank, and the pressure of the gaseous fluid introduced into the tank. The latter pressure, naturally, should be relatively low, in order to prevent rupture of the tank, and as already indicated hereinabove, the gaseous fluid is preferably admitted into the tank in a restricted stream, so as to limit the development of pressure; and it accordingly follows that the spring 143 should not be too heavy to defeat this purpose.

Accordingly it will be seen that a novel method of discharging fuel from a fuel tank in an aeroplane, in order that the tank may be used as a flotation member, has been provided which incorporates a simple and effective dump valve operating mechanism and a vent line valve which cannot be operated until the dump valve operating mechanism has functioned.

From the foregoing disclosure it will be apparent that this invention resides in a method embodying certain principles of construction which may be employed in other physical forms of apparatus without departure from the method shown. It is apparent that the form of the apparatus illustrated in the drawings for the purpose of disclosure has been given solely in the illustrative sense and not in any limiting sense. The scope of this invention is best defined by the appended claims.

I claim:

1. In a vent closure means for a fuel tank comprising a body mounted on the fuel tank, a vent port in the body communicating with the tank, a valve to permit closure of the vent port, a second port in the body communicating with the tank and adapted to discharge a fluid under pressure in the tank, a check valve normally closing the second port, the first valve and the check valve being operable by a fluid under pressure, and a toggle mechanism to normally prevent movement of the first valve.

2. In a valve for a fuel storage tank comprising a body, a chamber adapted to communicate with the tank, a vent port communicating with the chamber, a second chamber associated with the first chamber, a port in the second chamber adapted to communicate with the tank, a check valve normally preventing communication therebetween, a piston valve in the second chamber adapted to close the vent port, and a toggle mechanism associated with the piston to normally hold the piston in a fixed position.

3. In a valve for a fuel storage tank comprising a valve body, a chamber in the body adapted to communicate with the tank space, a port in the body adapted to discharge fluid under pressure into the tank, a check valve to normally prevent communication with the tank through the port, a vent port communicating with the tank, a seat surrounding the vent port (a piston in the chamber adapted to coact with the seat, a toggle mechanism associated with the piston to normally prevent movement of the piston, and a port whereby a fluid under pressure may be supplied to move the piston against said seat and open the check valve to permit communication of said discharge port with the tank.

4. In a valve associated with a fuel storage tank, a body, a bonnet on the body, a chamber in the body in communication with the tank, a vent port in the bonnet normally communicating with the chamber, a seat in the chamber surrounding the vent port, a piston chamber in the body, a piston rod passing through the piston chamber, the first named chamber and the bonnet; a piston valve on the rod adapted to coact with the vent port seat, a fluid pressure inlet port in the body associated with the piston chamber, whereby a fluid under pressure is permitted to move the piston valve against the vent port seat to close the vent port, a pin on the rod in the bonnet, a pair of links associated with the pin, a second pin connecting the outer ends of the links, a sleeve fixed in the bonnet having diametrically opposed slots adapted to receive said second pin, a spring in the sleeve adapted to bear against said second pin, whereby the spring will normally prevent movement of the rod, an indicator on the rod exterior of the bonnet to indicate the position of the piston valve, a port associated with the piston chamber communicating with the tank, a nozzle to restrict the port passage, and a check valve to normally prevent communication between the port and the tank comprising a bushing having a sleeve, a valve body in the sleeve, a valve proper in the body, a seat surrounding the port passage, a spring in the sleeve bearing on the valve body to hold the valve proper securely against the seat, adapted to be compressed by a fluid under pressure acting on the valve proper whereby the last named port will be opened and permit discharge of a fluid under pressure to the tank.

5. A method of rapidly discharging a fuel from an aeroplane fuel tank having a normally closed discharge port and a vent to permit use of the tank as a flotation member, comprising conducting a portion of a fluid medium under pressure to the discharge port to force the latter open, conducting a second portion of said fluid medium after the first portion has forced the discharge port open to a tank vent closing mechanism, to close said vent thereafter utilizing the second portion of the pressure medium to force the fuel from the tank, and thereafter closing the discharge port to isolate the tank against the entry of external media.

6. In an aeroplane, a liquid fuel tank having a vent in communication with the fuel space of the tank, a vent closing means, means to discharge a gaseous fluid under pressure into the fuel space of the tank to expel the liquid fuel therefrom, means to close the vent port by said fluid, and means to prevent venting of the tank through the second named means.

7. That method of discharging a liquid from a storage space having a normally closed liquid discharge port and a vent for the space above the liquid, which comprises utilizing a fluid medium under high pressure to force open said discharge port, thereafter utilizing a portion of said fluid medium to close said vent and expel the liquid from said storage space, said medium under high pressure being introduced into said storage space in a restricted stream for the purpose of controlling the development of pressure in the space, and thereafter closing the discharge port to isolate the tank against the entry of external media.

8. That method of discharging fuel from an aeroplane fuel storage space having a normally closed fuel discharge port which comprises the utilization of a fluid medium under high pressure to force open said discharge port, thereafter utilizing said fluid medium to expel fuel from said storage space, said medium under high pressure being introduced in a restricted stream for the purpose of limiting the development of pressure in the storage space, and thereafter closing the discharge port to isolate the tank against the entry of external media.

9. A method of rapidly discharging fuel from an aeroplane fuel tank having a vent and a normally closed tank discharge opening to permit use of the tank as a flotation member comprising the employment of a medium under pressure to open said tank discharge opening, thereafter employing a portion of the medium under pressure to close the tank vent and to expel the fuel from the tank through the now open discharge opening, and thereafter closing the discharge opening to isolate the tank against the entry of external media.

10. A method of rapidly discharging fuel from an aeroplane fuel tank having a vent and discharge means normally offering unyielding resistance to fluid pressure within the tank to permit use of the tank as a flotation member comprising the employment of a medium under pressure to overcome said resistance to thereby open the tank discharge means, thereafter employing a portion of the medium under pressure to close the tank vent, introducing the remainder of the medium under pressure into the tank to aid the fuel in escaping through said discharge means, and isolating the tank inside from any medium outside the tank after substantially all the fuel has been discharged.

11. A method of rapidly discharging fuel from an aeroplane fuel tank having a vent and a normally closed tank discharge opening to permit use of the tank as a flotation member comprising the separate steps of opening said tank discharge opening, closing the tank vent, admitting a fluid medium under pressure into the tank to aid the escape of the fuel through the discharge opening, and isolating the tank inside from any medium outside the tank after substantially all the fuel has been discharged, said method being particularly characterized by the fact that all of the steps following the first step can only occur after the first step has been completed.

12. A method of rapidly discharging fuel from an aeroplane fuel tank having a vent and a normally closed tank discharge opening to permit use of the tank as a flotation member comprising employing a medium under pressure to open said tank discharge opening, thereafter utilizing a portion of the medium under pressure to close the tank vent, introducing a portion of the medium under pressure into the tank in a restricted stream to control the development of pressure in the tank, and isolating the tank inside from any medium outside the tank after substantially all the fuel has been discharged.

HENRY ERNEST HEIGIS.